March 11, 1958     N. M. ROBBOY     2,826,440
COMBINED SWIVEL AND PIVOT JOINT FOR ELECTRICAL FIXTURES
Filed Aug. 24, 1954     2 Sheets-Sheet 1
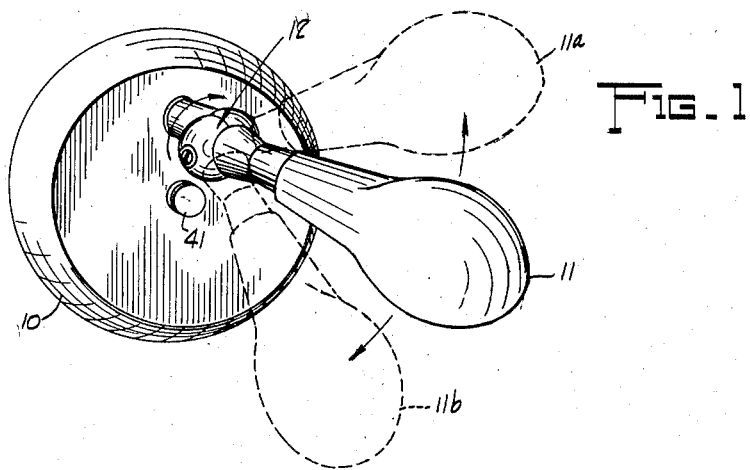
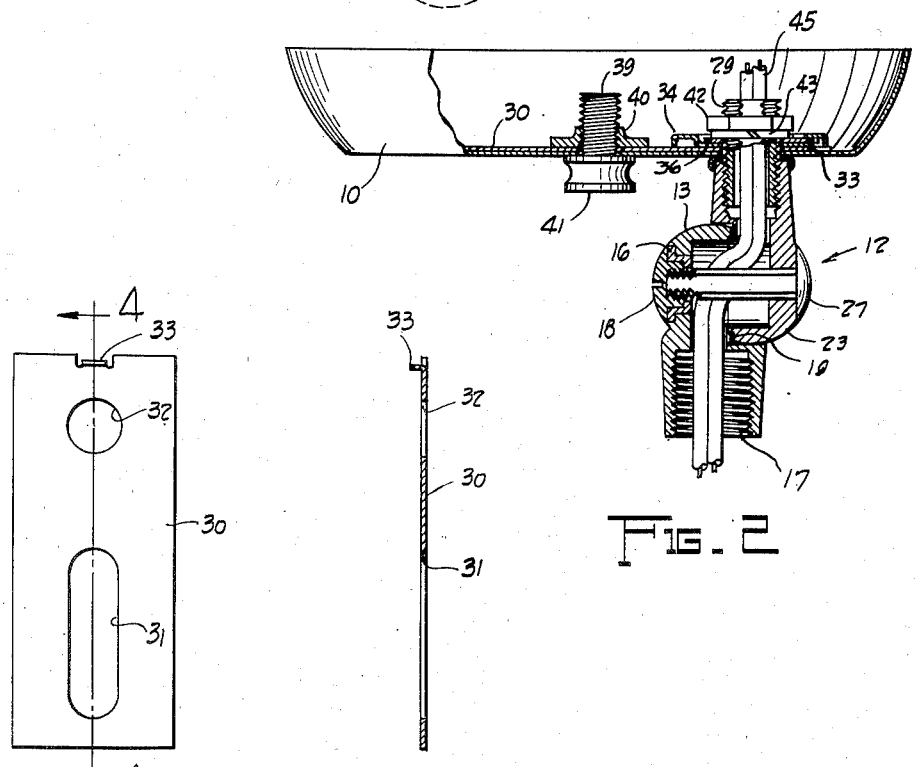
INVENTOR.
NATHAN M. ROBBOY
BY
ATTORNEY March 11, 1958 N. M. ROBBOY 2,826,440
COMBINED SWIVEL AND PIVOT JOINT FOR ELECTRICAL FIXTURES
Filed Aug. 24, 1954 2 Sheets-Sheet 2
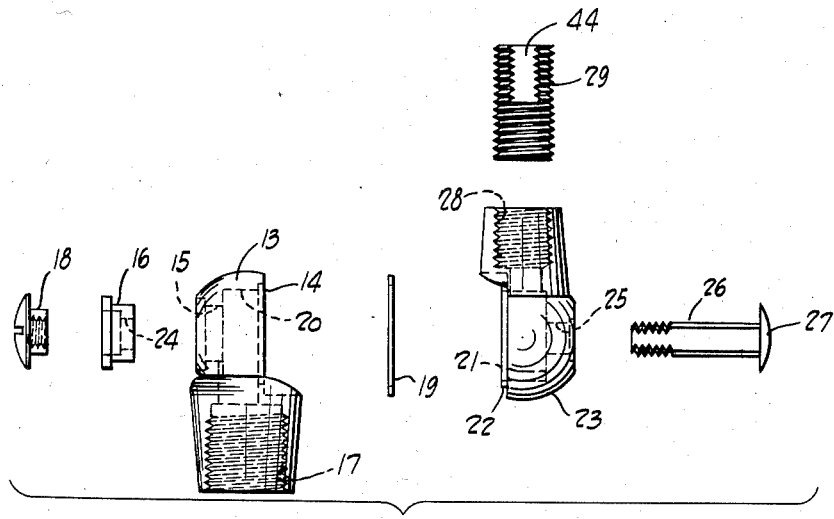
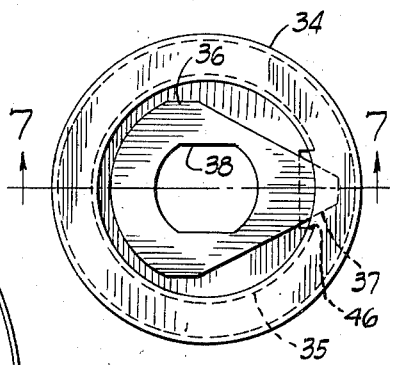
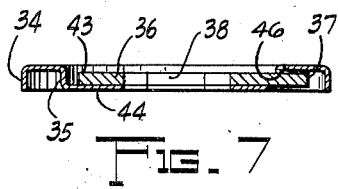
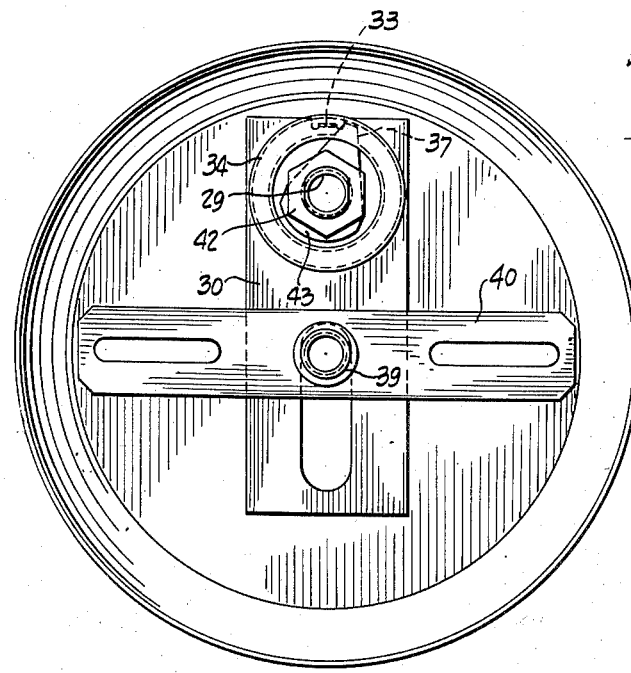
INVENTOR.
NATHAN M. ROBBOY
BY
ATTORNEY United States Patent Office 2,826,440
Patented Mar. 11, 1958

2,826,440

COMBINED SWIVEL AND PIVOT JOINT FOR ELECTRICAL FIXTURES

Nathan M. Robboy, Cleveland Heights, Ohio

Application August 24, 1954, Serial No. 451,908

2 Claims. (Cl. 287—91)

This invention relates to combined swivel and pivot units and more particularly to such units that may be attached to electric light fixtures such as ceiling lamps, wall lamps, floor lamps, desk lamps, industrial lamps and other such fixtures of the incandescent or fluorescent type.

The primary object of this invention is to provide a unit that will permit the swivel member to rotate approximately 280° and the pivot member to travel through an arc of approximately 205°.

A further object resides in the provision of means for preventing the rotative movement of the swivel member beyond one revolution.

Another object is to provide a device of the type stated that will hold its adjustment under conditions of severe vibration, while at the same time being easily movable to a new position when desired.

Still other objects are to provide such a device that is economical to manufacture, easy to assemble, adjust and service and free from fire hazard.

These and other objects of the invention will become apparent from a reading of the following specification and claims, together with the accompanying drawings, wherein like parts are referred to and indicated by like reference characters and wherein;

Figure 1 is a perspective view of the combined swivel and pivot unit that is the subject of this invention as it appears mounted on a wall canopy;

Figure 2 is a top plan view with portions broken away and sectioned to show the relation of the various members;

Figure 3 is a front view of the swivel base member;

Figure 4 is a right end view of the same;

Figure 5 is an exploded view of the pivot unit;

Figure 6 is a top plan view of the swivel washer and lug assembly;

Figure 7 is a vertical cross-sectional view taken along the line and in the direction of the arrows 7—7 of the Figure 6; and Figure 8 is a rear view of the canopy illustrated in the Figure 1.

Referring more particularly to the Figure 1 of the drawings, there is seen the combined swivel and pivot unit, broadly indicated by reference numeral 12, that is the subject of this invention, as it appears mounted on a wall canopy 10 while supporting an electric incandescent light socket and shade 11. It is of course to be understood that the unit 12 may be used with other types of fixtures such as ceiling, floor, desk and industrial lamps, and may be used in connection with fluorescent as well as incandescent lamps.

The swivel element comprises a base member 30 fabricated from a flat piece of sheet metal having a finger 33 cut and formed at the upper edge thereof. The finger 33 is bent outward from the plane of the base 30 and is perpendicular thereto, as is seen most clearly in Figures 3 and 4. A bore 32 is located in spaced relation to the finger 33 with its center aligned with the midpoint of the finger 33.

The base member 30 is mounted on the inside face of the canopy 10 by means of the strap 40 which is engaged by a threaded nipple 39 which is passed through slot 31 in the base member 30. A cap nut 41 engages the end of the nipple 39 on the outer or front face of the canopy 10, to clamp the base 30 between the strap and inner canopy wall face. The canopy 10 has a hole therethrough which is aligned with the bore 32 when the base is so mounted.

While the base 30 has been illustrated as being a separate element attachable to the canopy 10, it is to be understood that the canopy itself might act as the base by providing it with an upstanding finger and a bore spaced therefrom, similar to the finger 33 and bore 30.

A threaded hollow shaft 29 is journaled in the bore 32. The pivot element of the unit is mounted on the outer end of the shaft 29 through threaded socket 28, as seen in Figure 2. The shaft has two parallel flat faces 44 extending longitudinally thereof.

A circular sheet material washer 34 having a bearing surface 44 and a peripheral channel 35, bounded by annular walls, is mounted on the inner end of the shaft 29. The inner of said annular walls has an aperature 46 therethrough. The washer 34 has a substantially rectangular shaped hole 38 therethrough which matches the shape of the shaft 29, so that the washer is free to move longitudinally of the shaft while at the same time being locked thereto against relative rotation.

The depth and width of the washer channel 35 is such that it will receive the finger 33 therein without touching it, when the washer is drawn up against the base 30 by the pressure of the spring 43 and lock nut 42. A lug 36 is mounted on the washer. The lug has a substantially triangular shaped tip portion 37 which protrudes through the aperture 46 into the channel 35, as it seen most clearly in Figure 7.

The washer so mounted covers the finger 33 with its bearing surface 44 pressed against the base 30. When the shaft 29 is rotated, the washer 34 rotates with it over the finger 33 which is nested within the channel 35. Rotation can continue freely in either direction until the tip 37 strikes the side of the finger 33. Thus continued rotation in either direction is limited to less than a complete turn of 360°, so that any flexible cable within the hollow shaft 29 will not be twisted beyond its elastic limit. The closeness of rotation to 360° is determined by the width of the tip 37 and finger 33. The practical limit is 280° which is provided by a finger and tip of sufficient width to stand up under prolonged rough treatment.

Pivoting motion at right anges to the axis of swivel motion is provided by a joint made up of two hollow elements 23 and 13 which are mounted on the end of shaft 29 through threaded socket 28 and to which the article to be supported, such as incandescent light socket and shade 11, is secured in threaded socket 17. The hollow elements 13 and 23 have interfitting circular channels 14 and 22 respectively upon which they can rotate relative one to another. A resilient fiber gland 19 is interposed between the channel element for a purpose to be disclosed hereinafter.

The first element 13 has a counterbored hole 15 therethrough which communicates with the interior cavity 20. The second element 23 has a rectangular hole 25 therethrough which communicates with its interior cavity 21. The holes 15 and 25 have a common center line when the two elements 13 and 23 are interfitted.

Reference numeral 16 indicates a shouldered sleeve that is journaled in the counter-bored hole 15. The sleeve 16 has a rectangular bore 24 therethrough.

The two complementary elements 13 and 25 are held together by a threaded bolt 27 which passes through holes 25 in element 23 and bore 29 of sleeve 16. The bolt has two parallel flat sides 26, which give the bolt a substantially rectangular cross-section of the same shape as that of the hole 25 and bore 24.

A hollow internally threaded headed screw 18 engages the threaded end of the bolt 27 to draw the two elements tightly together. Since the bolt 27 and hole 25 are both rectangular in cross section, the bolt 27 and element 23 are immovably locked together.

Furthermore, since the shape of the sleeve bore 24 and that of the bolt 27 is also rectangular, the sleeve is also immovably locked to the bolt 27. Movement between the elements 13 and 23 therefore occurs between the sleeve 16 and the bore 15 of the element 13. When the screw 18 is tightened it bears against the shoulder of the sleeve 16 and does not touch the element 13. Tightening of the screw 18 determines the compressive pressure exerted upon the resilient gland 19 between the channels 14 and 22. Thus the force required to pivot the elements relative to one another can be easily adjusted by means of the screw 18. The force is determined by the weight of the supported article 11.

It will be apparent from the foregoing description that all pivoting adjustments are made by adjusting the single screw 18. Furthermore, the adjustment so made will be permanently maintained because there is no movement between the screw 18 and any of the surfaces with which it comes in contact. While the shape of the bolt 27 and its associated hole 25 and bore 24 has been described as being substantially rectangular, it is to be understood that any connecting means that will insure immovability between the bolt and its associated parts may be employed.

Reference numeral 45 indicates a two conductor electrical cable that passes through the joint to supply power to the supported fixture 11.

The joint so described provides both swivel and pivoting motion (as indicated by reference numerals 11a and 11b showing alternate pivoted and swiveled positions together with the arrows of rotation in Figure 1) while at the same time limiting such motion to a degree that will insure freedom from breakdown or fire hazard to any electrical cable passing therethrough to a fixture supported thereby.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A swivel joint comprising in combination, a base member having a bore therethrough and a finger element spaced from said bore extending parallel to the axis of the bore, a shaft journaled in said bore, adapted to support an article to be swiveled relative the base, a circular washer including a peripheral channel bounded by annular walls, the inner of said walls having an aperture therethrough, a lug element mounted on the washer having a tip protruding through the aperture into the channel and covered thereby, the washer being mounted on the shaft and rotatable therewith, with the base finger positioned in and covered by the channel, the lug tip, within the channel, being engageable with the base finger upon rotation of the shaft, to limit said rotation to less than 360° in either direction.

2. A swivel joint, comprising in combination, a sheet material base member having a finger formed integral therewith and extending perpendicular to the surface thereof, the base member also having a bore therethrough spaced from said finger, a shaft adapted to support an article to be swiveled relative to the base, journaled in said bore; a circular sheet material washer having a central bearing surface and a peripheral channel portion formed integral therewith, bounded by annular walls, the inner of said walls having an aperture therethrough, the washer being mounted on said shaft and rotatable therewith, the channel portion being faced toward the base and of a width and depth to clear the finger, the base finger being housed entirely within said channel; spring pressed means on the shaft urging the washer bearing surface against the base member; and a lug immovably mounted on the washer, between the center thereof and the inner annular wall of the peripheral channel, having a tip portion protruding through the wall aperture into the channel and covered thereby, the said tip being engageable with alternate sides of the finger housed within said channel, upon rotation of the washer and shaft, to limit said rotation to less than 360° in either direction.

References Cited in the file of this patent

UNITED STATES PATENTS

| | | |
|---|---|---|
| 442,809 | Hunter | Dec. 16, 1890 |
| 1,551,332 | Schramm | Aug. 25, 1925 |
| 1,765,693 | Muend | June 24, 1930 |
| 1,822,260 | Adams | Sept. 8, 1931 |
| 2,255,262 | MacFadden | Sept. 9, 1941 |
| 2,352,806 | Schwartz | July 4, 1944 |
| 2,472,624 | Schwartz | June 7, 1949 |